United States Patent
Cavaglia

(10) Patent No.: US 7,557,180 B2
(45) Date of Patent: Jul. 7, 2009

(54) SOLID PHASE CONTINUOUS POLYMERISATION OF POLYETHYLENE TEREPHTHALATE (PET) REACTOR AND PROCESS

(76) Inventor: Giuliano Cavaglia, Via San Marco No. 1, Pessione Fraz. Di Chieri (Turin) (IT) I-10020

(*) Notice: Subject to any disclaimer, the term of this patent is extended or adjusted under 35 U.S.C. 154(b) by 562 days.

(21) Appl. No.: 10/537,350

(22) PCT Filed: Oct. 9, 2003

(86) PCT No.: PCT/EP03/11181

§ 371 (c)(1),
(2), (4) Date: Jun. 6, 2005

(87) PCT Pub. No.: WO2004/058852

PCT Pub. Date: Jul. 15, 2004

(65) Prior Publication Data

US 2006/0165564 A1    Jul. 27, 2006

(30) Foreign Application Priority Data

Dec. 24, 2002  (IT) ............................ TO2002A1124

(51) Int. Cl.
*C08G 65/46* (2006.01)
*B01J 19/18* (2006.01)

(52) U.S. Cl. .................... 528/491; 528/492; 422/131; 422/134; 422/135; 422/137

(58) Field of Classification Search .................. 422/131, 422/134, 137, 135; 528/492, 491
See application file for complete search history.

(56) References Cited

U.S. PATENT DOCUMENTS

| | | | |
|---|---|---|---|
| 2,498,405 A * | 2/1950 | Fader | 422/127 |
| 3,330,809 A | 7/1967 | Perlowski et al. | |
| 3,440,019 A | 4/1969 | Albrecht et al. | |
| 4,129,701 A * | 12/1978 | Jezl et al. | 526/65 |
| 4,370,302 A * | 1/1983 | Suzuoka et al. | 422/137 |
| 5,169,913 A * | 12/1992 | Staffin et al. | 526/65 |
| 5,245,093 A * | 9/1993 | Ember | 585/266 |
| 5,408,035 A * | 4/1995 | Duh | 528/480 |
| 5,440,005 A * | 8/1995 | Pikus | 528/308.2 |
| 7,074,368 B2 * | 7/2006 | Yang et al. | 422/131 |
| 7,098,300 B1 * | 8/2006 | Chen et al. | 528/492 |

FOREIGN PATENT DOCUMENTS

| | | |
|---|---|---|
| EP | 0 712 703 A2 | 5/1996 |
| GB | 1 282 030 | 7/1972 |
| JP | 49-18177 | 2/1974 |

* cited by examiner

*Primary Examiner*—N. Bhat
(74) *Attorney, Agent, or Firm*—Bacon & Thomas, PLLC

(57) ABSTRACT

A reactor and a process for solid phase continuous polymerization of polyethylene terephthalate (PET) in order to achieve an increase of the intrinsic viscosity (I.V.) of a low molecular weight PET pre-polymers flow. A plurality of fluidized stages in series (109; 309) are provided and said PET pre-polymers flow is fed into said fluidized stages in series (109; 309). An inert gas flow is fed either in cross-flow or in counter-current flow with respect to the PET pre-polymers flow.

51 Claims, 9 Drawing Sheets

SOLID PHASE CONTINUOUS POLYMERISATION OF POLYETHYLENE TEREPHTHALATE (PET) REACTOR AND PROCESS

BACKGROUND

A. Field

The present invention relates to a reactor and a process for solid phase continuous polymerisation of polyethylene terephthalate (PET).

B. Related Art

More exactly, the present invention relates to a reactor and a process for solid phase continuous polymerisation of polyethylene terephthalate (PET) in order to achieve an increase of the intrinsic viscosity (I.V.) of a low molecular weight PET pre-polymers flow.

Generally, PET manufacturing process includes four steps: esterification, pre-condensation, finishing step and solid phase polymerisation.

In the past, PET manufacturing process was carried out by transesterification of dimethyl terephthalate (DMT) with ethylene glycol (EG) while direct esterification of purified terephthalic acid (PTA) with ethylene glycol (EG) is nowadays well-established, whose advantages mainly reside both in its cost effectiveness and in its higher reaction rate.

Ethylene glycol (EG) and oligomers are present among the by-products at the end of the reaction.

Ethylene glycol (EG) is usually recycled in feed at the beginning of the process, thus increasing the overall yield; the oligomers have to be removed and then be disposed of or, alternatively, recycled to continue increasing their polymerisation grade.

It is known that the oligomers in the field of interest, i.e. within the PET manufacturing processes and, more generally, within the polyester ones, are normally molecules having 2, 3 or maximum 4 polymerisation grade, at gaseous state at high temperature conditions and at liquid state at temperatures lower than 120÷150° C.

Said oligomers are present at gaseous state at the end of the reaction, but tend to condense on the colder metal surfaces of piping/fittings they pass through; once condensed, they tend to produce sticky mixture together with finest dusts that are not removed by cyclone separation systems usually provided downstream the PET manufacturing plants.

Such sticky mixture settles onto the pipes walls and progressively reduces the flow areas thereof, until causing the whole system shutdown in case it is not properly removed during maintenance operations.

In consequence of what above described, it becomes evident that the oligomers removal from the gaseous flow exiting the plant is essential.

The conventional melt-phase polymerisation processes routinely use the first three steps previously mentioned, i.e. esterification, pre-condensation and finishing step, to produce so-called pre-polymers for the subsequent solid phase polymerisation.

Solid phase polymerisation is a thermal treatment process that allows to increase the molecular weight of a polymer at different levels, depending on the kind of final product that it is wanted to be obtained.

It is known that the molecular weight of a polymer can be measured by the measure of its intrinsic viscosity I.V. (Intrinsic Viscosity).

It is also known that the increase of the molecular weight of a polymer can be achieved by subjecting low molecular weight polymers (pre-polymers), preferably under granular form, to a solid phase continuous polymerisation step on fluidised bed. Such process further allows to provide polymers with low acetaldehyde content, content that must be lower than 1 p.p.m. for the manufacturing of PET bottles intended for food use.

The pre-polymers fed to the solid phase polymerisation step can be under the form of completely amorphous pellets or partially crystallised pastilles.

Amorphous PET pellets are thermally stable only up to the glass transition temperature, which is about 80° C.; however, the temperature of the solid phase polymerisation process is higher than 200° C.

By subjecting amorphous PET pellets to a heating phase as well as to a temperature maintaining phase above the glass transition temperature, a progressive crystallisation of the polymeric bulk is achieved, by hardening the polymer matrix inside pellets themselves, so achieving thermal stability up to temperature values close to the onset (about 235° C.) of melting point.

Due to this reason, pre-crystallisers and crystallisers are generally necessary plant units upstream the conventional solid phase polymerisation reactor.

The purpose of the crystallisation step prior to solid phase polymerisation is to prevent the agglomeration of the granules during the polymerisation process, especially at the highest temperatures.

As a matter of fact, it is known that in nowadays employed industrial solid phase polymerisation plants, the granules agglomeration phenomenon frequently happens; this problem is particularly evident during PET solid phase continuous moving bed polymerisation for producing bottles intended for food use, when polymerisation is carried out at temperatures above the amorphous PET pre-polymer glass transition temperature, but below the melting point.

According to the conventional processes today available and employed for solid phase polymerisation, the PET pre-polymer (crystallised or partially crystallised) is fed at the top of a vertical moving or static bed reactor for solid phase polymerisation, in which the pre-polymer moves downwards by gravity in contact with an inert gas stream.

According to known prior art, the inert gas primarily functions to remove unwanted by-products, in particular ethylene glycol, acetaldehyde and water vapour, which are generated during polymerisation, while PET gradually moves towards the bottom of the vertical reactor.

In general, there are three important requisites that are to be met for correct operation of a continuous solid phase polymerisation process.

First, a steady and uninterrupted flow of PET granules must be maintained.

As a consequence, it is highly important that agglomeration of PET granules is avoided, since it would impede the smooth flow of granules and it would make difficult the discharge of the product from the reactor, thereby causing the plant control losing.

Secondly, a suitable combination of residence time and temperature of granules in the reactor is required to achieve the desired molecular weight, which is measurable, as indicated above, in terms of intrinsic viscosity I.V.

Since reaction rate increases with temperature increase, and I.V. increases with residence time increase in the reactor, desired I.V. can be attained either by using a relatively long residence time, with a relatively low temperature, or a relatively short residence time with a relatively high temperature.

However, the ideal combination of residence time and temperature must be chosen taking into account the first of the requisites indicated above, i.e. the need to maintain a linear flow, thereby avoiding the granules agglomeration phenomenon.

Third, the flow regime of PET granules processed inside the solid phase polymerisation reactor, must be as close as possible to the ideal plug-flow behaviour; this way all PET granules passing through the reactor undergo the same conditions of treatment and a narrow molecular weight distribution in the obtained product and, more in general, a narrow distribution of polymerised granules final attributes, which is a key factor for the required performance during subsequent high I.V. PET product processing/converting steps, will be achieved.

As regards the first requisite, that is the need to avoid the PET granules agglomeration, it is to be said that this phenomenon is mainly affected by temperature, granules size, bed height, granules flow velocity within the reactor and PET morphology.

PET granules, initially moving freely in a moving bed can stick and clot if, for instance, temperature or bed height increases or if cross-sectional velocity decreases.

At solid phase polymerisation conditions, PET is only partially crystallised and, as a consequence, such a PET is not a rigid body, but it is rather a slightly sticky body.

Since the PET tendency to become sticky increases with temperature increase, the agglomeration tendency also increases with temperature increase.

A fixed bed of PET granules held motionless inside a solid phase polymerisation vertical, cylindrical reactor is taken into account.

Under these conditions, at polymerisation temperature and under pressure due to the weight of the PET granules bed, granules to be polymerised creep into one another at contact points and, in time, polymer granules will tend to agglomerate and form larger lumps.

The most effective way to prevent lumping is to constantly renew the intergranular contact areas, so that polymer granules do not have a chance to creep into one another.

This purpose is achieved by maintaining a constant flow of polymer granules at sufficiently high velocity.

Since agglomeration tendency increases with the increase of the specific surface area (area per unit mass) or, more precisely, with the increase of the specific contact area of polymer granules, it also increases with the decrease of the size of polymer granules.

A reduced granules size contributes to accelerate the polymerisation process, however, on the other hand, the agglomeration tendency of polymer granules increases.

In presence of small size granules it is therefore required to counterbalance the increased agglomeration tendency with a temperature decrease, which, on the other hand, brings the final values of the process rate back to the typical ones for larger size granules treated at a higher temperature.

Furthermore, if the particle size is reduced below certain limits, agglomeration occurs practically at any temperature.

In a static or moving bed situation, the compaction pressure undergone by polymer granules is approximately proportional to the weight of the polymer granules inside the bed which, in its turn, is proportional to the bed height above the granules; therefore, polymer agglomeration tendency is highest at the bottom of the bed and lowest at the top.

From what above mentioned it results that polymer lumps start generally to form near the bottom of the bed; for this reason there is a practical limit on the bed height of a solid phase polymerisation reactor.

At a sufficiently high flow velocity, polymer granules change their positions relative to each other (by sliding, for instance) and lumps formation is thereby prevented.

Since the change rate of polymer granules contact areas and the reduction of bed bulk density increase with the increase of the granules velocity, polymer agglomeration tendency inside the reactor decreases with the increase of the granules cross-sectional velocity.

For each combination of reactor temperature, bed height, and particle size, there exists a minimum granules velocity necessary to prevent agglomeration.

For each given size and shape of polymer granules, the minimum velocity to prevent agglomeration increases with the increase of temperature and bed height.

In case polymerisation temperature increases or in case bed height increases, a higher velocity has to be used; in case, for instance, of commercial scale vertical reactors, with outputs up to 300 metric tons per day and which are conventionally 18 to 22 meters high, a velocity of at least 2 meters per hour is generally required.

A well designed solid phase polymerisation commercial scale plant must be capable of continuously producing outputs having intrinsic viscosity I.V. in compliance with the required specification at a sufficiently high throughput.

The currently used plants employ single or multiple vertical cylindrical reactors 10 to 30 meters high; in those plants the reactor is operated at a temperature of 200 to 230° C. and at a granules moving velocity of 1.00 to 2.52 meters per hour. Within the above-mentioned ranges of temperature, bed height, and granules velocity, the choice to achieve a product with the desired I.V. can be made.

These conventional currently used plants allow to produce PET having an I.V. of 0.72 to 0.86 dl/g, using PET pre-polymers with an I.V. of 0.55 to 0.65 dl/g; these conventional plants can increase polymer I.V. by about 0.12-0.25 dl/g.

Amorphous PET granules have intrinsic viscosity values generally comprised in the range 0.57÷0.62 dl/g; the reaction time necessary to achieve final I.V. value in the range 0.72÷0.85 dl/g, required for the most bottle manufacturing applications, is of 12÷18 hours.

Usually, PET I.V. is brought to the above-mentioned values, commercially required for bottle manufacturing, through polymerisation processes carried out in continue solid phase vertical reactors, in which solid bed of PET granules moves downwards by gravity.

For some specific applications, for instance PET pre-polymers polymerisation for standard bottle manufacturing, characterised by initial I.V. values of 0.25-0.45 dl/g, it is necessary to increase said I.V. by more than 0.25 dl/g.

This result is hardly achievable and often it is not achievable in a conventional plant using said vertical reactors.

In a conventional process, there are two ways to raise the product I.V.; namely, to increase the reactor temperature or to increase the granules residence time inside the reactor.

The residence time inside the reactor is constrained by bed height and by granules velocity; it can be increased either by increasing bed height or by decreasing granules velocity.

Increasing the reactor diameter allows an increase in the throughput rate, but not in residence time at constant granules velocity.

On the other hand, if reactor temperature is raised to increase the final product I.V., polymer agglomeration tendency will consequently increase.

To prevent polymer agglomeration, bed height has to be decreased or granules velocity has to be increased. However, both these modifications reduce residence time inside the reactor and nullify the effect of the temperature increase.

Alternatively, if the residence time inside the reactor is increased either by increasing the bed height (assuming the reactor is sufficiently tall) or by reducing the granules velocity, an increase of the polymer agglomeration tendency is caused.

To prevent the agglomeration phenomenon, the reactor temperature must be lowered and this once again nullifies the effect of the residence time increase on the product final I.V.

These constraints limit the ability of conventional plants, which use single or multiple vertical reactors, to increase the polymer intrinsic viscosity I.V.

A similar situation is encountered when a commercial scale plant with a capacity above 360 metric tons per day has to be designed for conventional continuous solid phase polymerisation processes.

In fact, in a conventional process, there are two ways to reach high plant production capacity: again by increasing the reactor temperature or by increasing the product volume ("hold-up") in the reactor.

As far as drawbacks due to the temperature increase are concerned, the same above described issues have to be considered.

On the other hand, the product volume ("hold-up") of PET granules in the reactor is constrained by bed height, reactor diameter and granules velocity.

If the product volume ("hold-up") is increased either by increasing bed height or reactor diameter, or by decreasing granules velocity, polymer agglomeration tendency will increase too.

Thus, these constraints limit the maximum capacity of conventional solid phase polymerisation processes, which use one or more vertical cylindrical reactors.

Nowadays, growing PET demand has given rise to a need for solid phase polymerisation processes by means of which it is possible to achieve a higher increase of PET molecular weight and a higher production capacity, typically higher than 300 metric tons per day on single plant.

One of the drawbacks of the plants according to the known prior art is due to the considerable vertical size of the plant structure due to the presence of the pre-crystallisation unit, which is stacked onto the crystallisation unit, stacked in its turn onto the solid phase polymerisation reactor.

A second drawback is represented by the long residence time, inside the conventional reactor, required to achieve the desired I.V. increase starting from amorphous pre-polymers; for example, to get from an I.V. of 0.60 dl/g to that of the final product, which is equal to 0.80 dl/g in the case of application in the manufacturing of standard bottles intended for food use, an average residence time equal to 15 hours is needed.

Such drawback is substantially due to two reasons: the fact that the solid phase polymerisation kinetic is linked to the reaction gaseous products diffusivity from the granules core to their outside and the fact that the pre-crystallisation and crystallisation steps, which are mandatory to secure enough flowability to the granules in a conventional moving bed solid phase polymerisation reactor, limit the polymeric matrix portion able to react, being the only non-crystalline portion to be involved in the reaction. A known solution to the above-mentioned problems consists in the use of PET sand of spherical granules having a sufficiently small size (typically 100÷200 μm) and of a great amount of inert gas in the reactor.

Thanks to these expedients the pre-crystallisation and crystallisation steps have been avoided, the reaction time has been reduced and the solid phase polymerisation reactor acquires lower size.

The aforesaid solution is nevertheless not optimal from the point of view of cost, of reactor size, of the achievable I.V., of I.V. distribution and of the reaction time.

SUMMARY OF THE DISCLOSURE

A first purpose of the present invention is therefore to provide an improved reactor for solid phase continuous polymerisation of polyethylene terephthalate (PET) in order to achieve an increase of the intrinsic viscosity I.V. that allows to overcome the constraints of the processes known so far, that is to reduce the process time and the reactor size.

A further purpose of the invention is therefore to provide a reactor and a process for PET solid phase polymerisation that allows to achieve high production capacities.

In the solid phase polymerisation plants also the gas flow-rate has to be sufficient to effectively remove the reaction by-products; as a matter of fact, a gas excess results in higher costs both for its supply and for its regeneration and disposal.

Therefore, a further purpose of the invention is to provide a reactor and a process for solid phase polymerisation that allows to reduce the costs due to the gas employment.

These and other purposes are achieved with the reactor and the process as claimed in the attached claims.

Advantageously, thanks to the provision of a plurality of fluidised stages to carry out the solid phase continuous polymerisation of a low molecular weight PET pre-polymers flow, a polymerisation up to the desired I.V. value in a moderate reaction time by using a compact reactor is achieved.

Advantageously, the reactor and the process according to the invention further allow to avoid unwanted agglomeration phenomena and other side effects even achieving higher molecular weight increases of the treated PET when compared with the ones achievable with the conventional processes of the known prior art.

The reactor and the process according to the invention further allows to achieve a high degree of plug-flow ("plug-flow") and, consequently a high homogeneity and uniformity of the final product.

Advantageously, moreover, the reactor according to the invention allows to achieve higher production capacities when compared with the plants exploiting the conventional processes.

Always according to the invention is furthermore possible to advantageously achieve a reduction of energy consumption, thanks to the decreased overall process ΔP required for the gas with respect to conventional processes.

The optimal number of fluidised stages was ascertained experimentally, by employing both a model formed by single fluidised bed reactors arranged in series, and a fluidised reactor model within which a plurality of fluidised stages is generated.

BRIEF DESCRIPTION OF THE DRAWING

The invention will be now described more in detail with particular reference to the attached drawings, provided by way of not limiting example, wherein:

With reference to FIG. 1A a reactor 101 comprising a horizontally arranged casing 103, having a substantially parallelepiped shape, is shown.

DETAILED DESCRIPTION OF PREFERRED EMBODIMENTS OF THE INVENTION

Figure 1A:
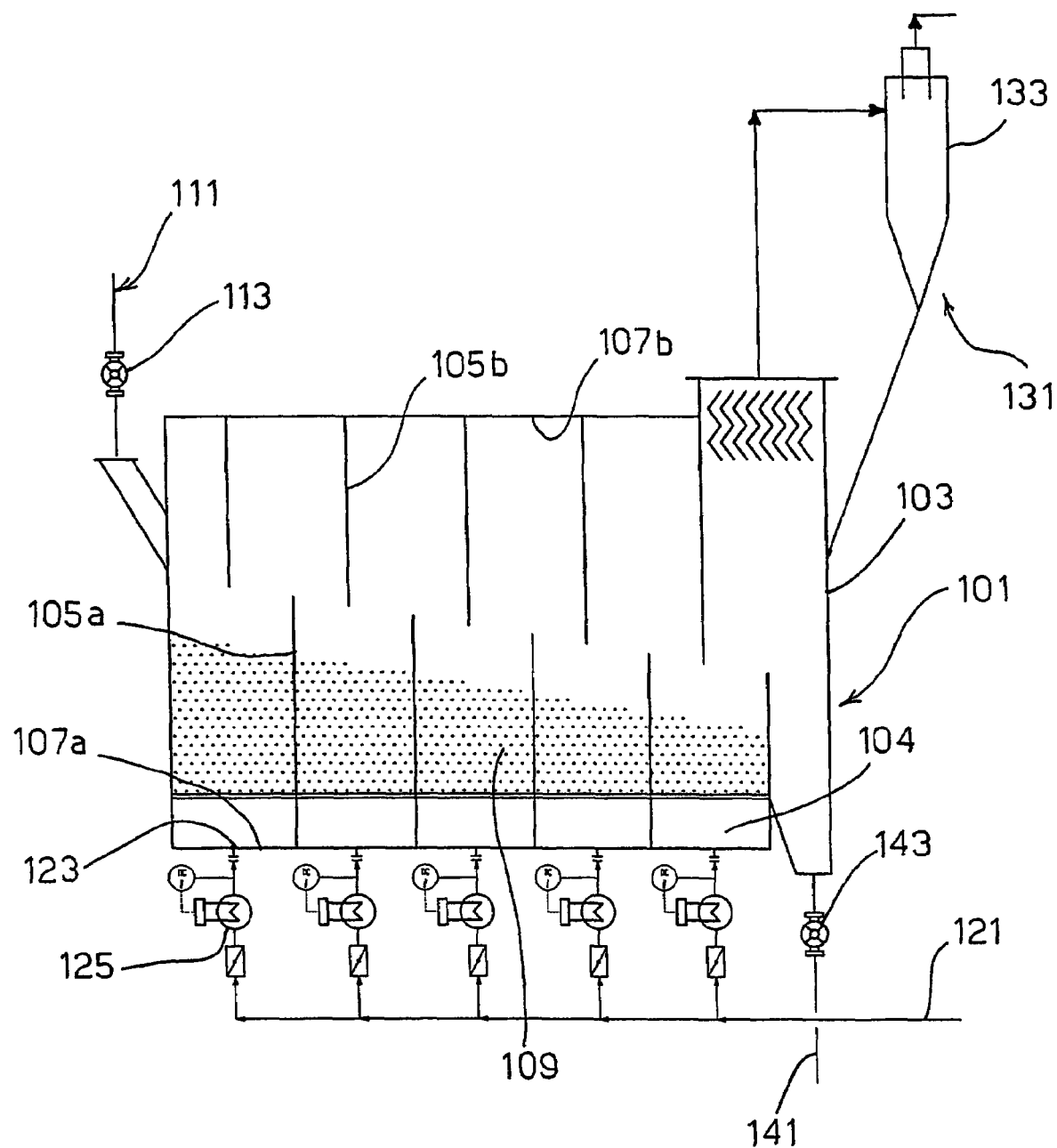
FIG. 1A is a diagram of a first embodiment of the invention.

A first feeding line 111, equipped with a device 113 (for example, a rotating volumetric distributing apparatus) to regulate the flow-rate of fed amorphous PET pre-polymer and to prevent gas leakage, is provided to feed a continuous low molecular weight PET pre-polymers flow (preferably a PET sand having granules with size in the range 100÷200 μm) to the top of reactor 101.

A second gas feeding line 121 is provided to feed through supply valves 123 an inert gas flow, preferably nitrogen, from the bottom into the reactor 101, in cross-flow with respect to the pre-polymer flow inside the reactor 101.

A circuit 131 connected to the reactor 101 is provided to purify the gas and to recover pre-polymer particles by means of a proper separator 133, such as a cyclone; solid particles dragged by the gas exiting the reactor 101 and recovered by means of the separator 133, are then recycled to the reactor 101.

Figure 1B:
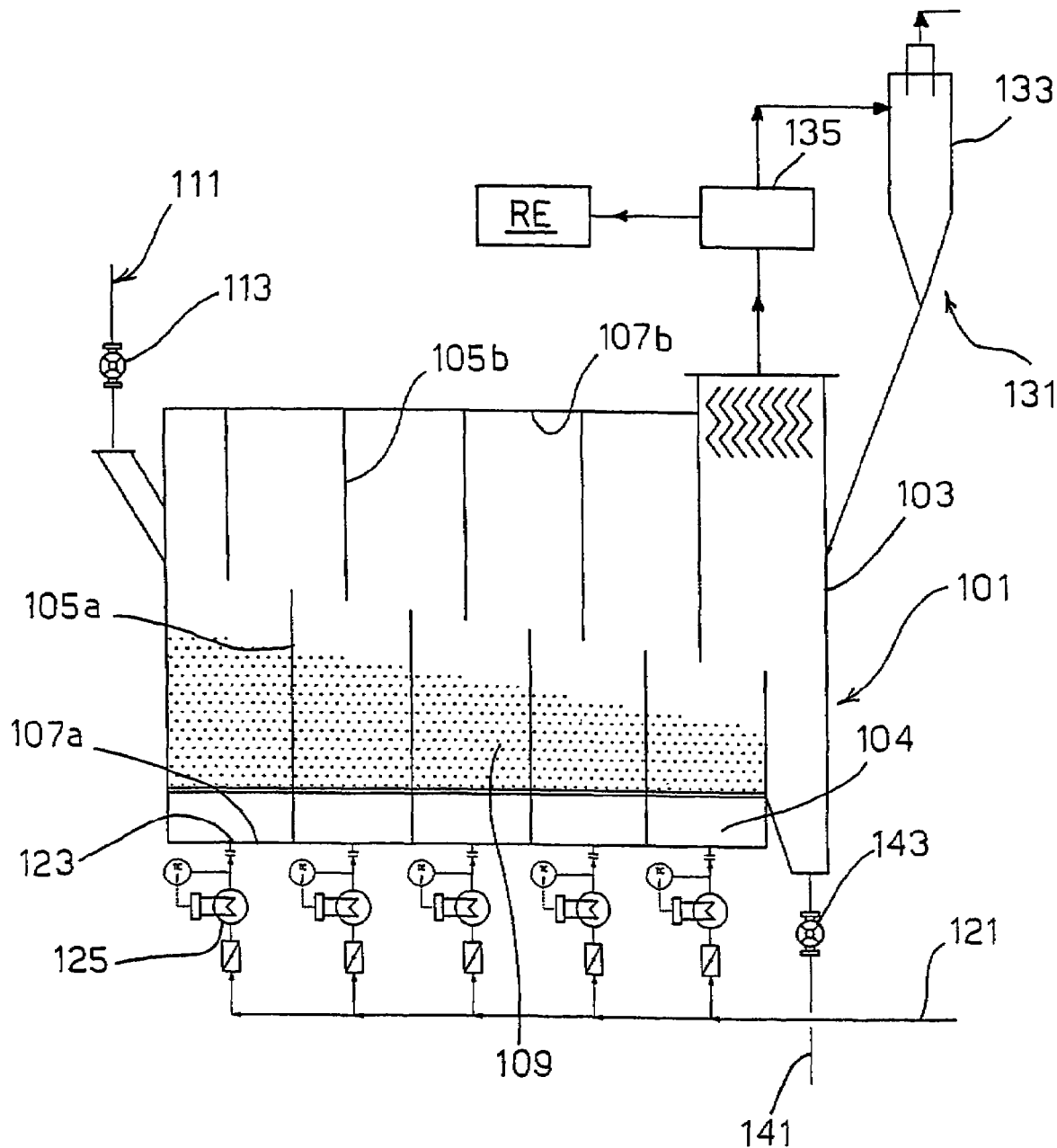
FIG. 1B is a diagram according to an alternative form of the embodiment of the invention shown in FIG. 1A.

According to an alternative form, shown in FIG. 1B, the gaseous flow containing, among others, ethylene glycol and oligomers, is forced to preventively pass through an appropriate separation device 135, such as for example a condensation separator, wherein ethylene glycol and oligomers are recovered at the liquid state and then recycled to the esterification reactor RE that is located upstream the manufacturing plant to carry out the primary reaction of the PET manufacturing process.

The gas without solid particles leaving the separator 133 from its head, is conveyed to a following purification unit (not shown) wherein all the residual hydrocarbons that are present in the gaseous flow are removed by means of known techniques, for example the catalytic oxidation; said gas flow is then subjected to drying, for example for adsorption on molecular sieves, and then recycled to the solid phase polymerisation reactor 101 as fluidising and stripping means of the reaction gaseous by-products.

A third discharging line 141, equipped with a device 143 (for example, a rotating volumetric distributing apparatus) to discharge the PET after solid phase polymerisation and to prevent gas leakage, is provided to discharge the polymerised product by being inferiorly connected to the bottom of the reactor 101.

Advantageously, according to the invention, inferior vertical walls 105a, secured to the base of the reactor 101, and superior vertical walls 105b, secured to the ceiling of the reactor 101, are provided inside the reactor 101.

Said walls 105a and 105b are preferably formed from metal plates secured, for example by welding, respectively to the base 107a of the casing 103 and to the ceiling 107b of the casing 103.

Moreover, said walls 105a have decreasing height in the polymer flow advancing direction, while said walls 105b have increasing height in the same direction in order to prevent that the polymer flow could "skip" one or more fluidised stages 109.

Said walls 105a and 105b are further spaced so as to create between them corresponding fluidised stages 109, which are generated thanks to the action of the opposite direction gas flow coming from the holed bottom 104 of the casing 103.

Advantageously, according to the invention, said supply valves 123 are in such a number and arranged in such a way to generate a sufficient gas flow in correspondence with each fluidised stage 109.

Moreover, each supply valve 123 or each supply valves 123 set associated to the same fluidised stage, is equipped with a heating device 125 suitable for bringing at the desired temperature the inert gas flowing through the bottom 104 of the reactor 101.

This way, still according to the invention, each fluidised stage 109 can receive inert gas at the optimal temperature chosen in dependence of the polymerisation degree reached inside the reactor 101 so achieving a non-isothermal process.

According to the invention, the pre-polymers flow, coming from the feeding line 111, passes through a plurality of fluidised stages 109, prior to reach the discharge line 141 located downstream the last fluidised stage.

During crossing reactor 101, pre-polymers are conveniently polymerised by achieving the desired intrinsic viscosity I.V.

According to the invention, the intrinsic viscosity value attained at the end of the reaction depends on the number of the fluidised stages.

As it will become evident from the following description, said fluidised stages are preferably in the number of five.

In order to optimise the number of fluidised stages to be created inside the reactor, some simulations have been carried out by employing as model a plant formed by a plurality of single fluidised bed reactors arranged in series.

Figure 2A:
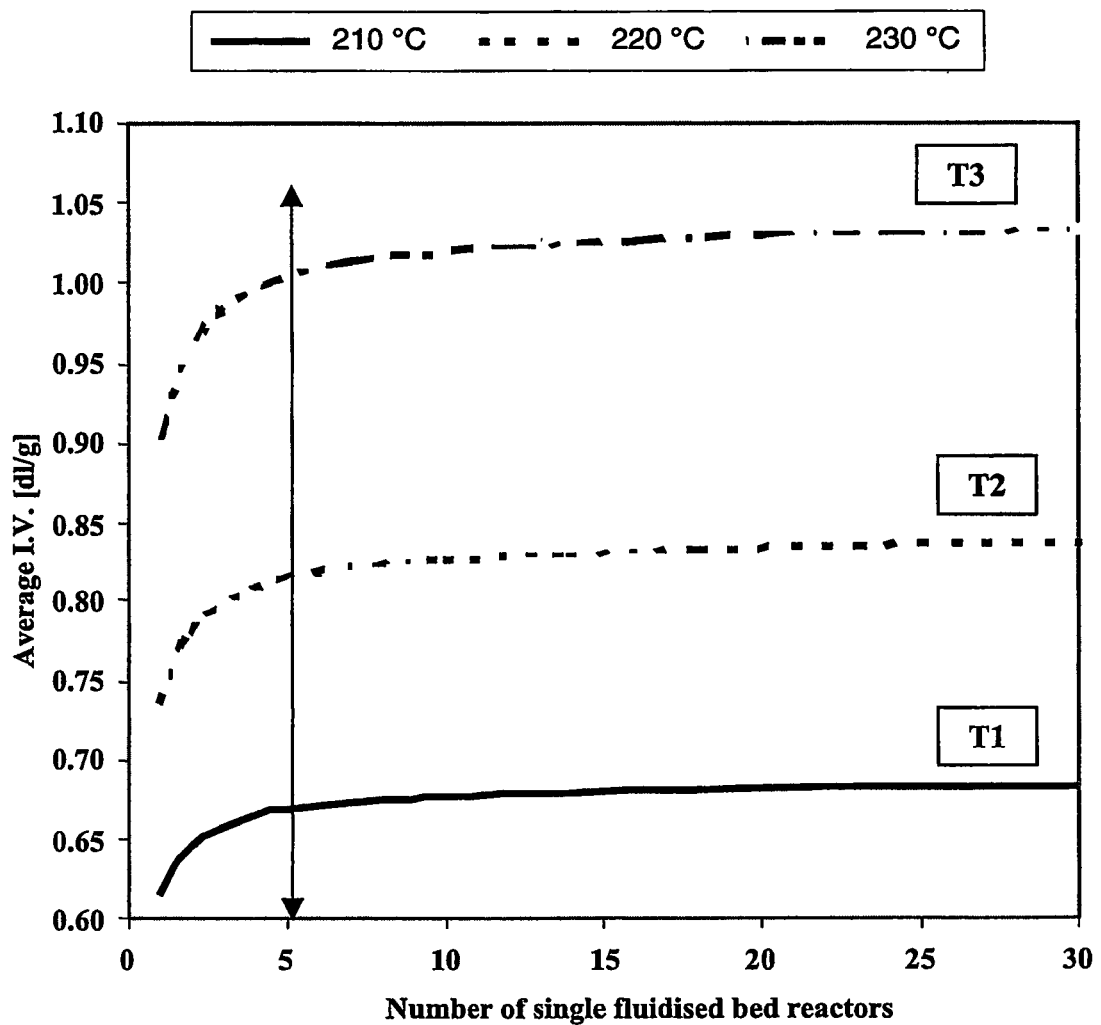
FIGS. 2A to 2E show the curves of some quantities that are significant for achieving the purposes of the invention.
Figure 2B:
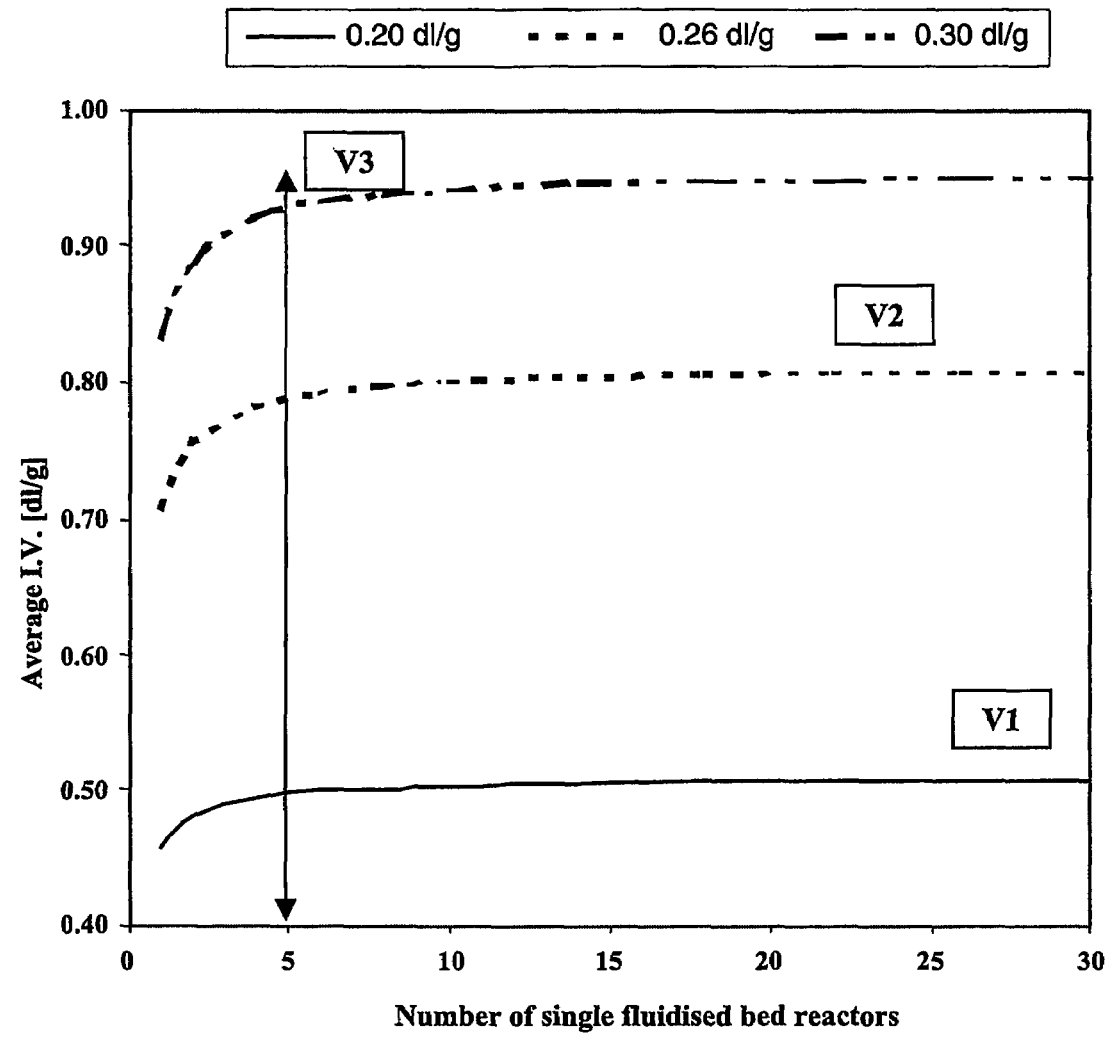

With reference to FIGS. 2A and 2B, the trend of the average I.V. final value with respect to the number of reactors of said plant model is shown.

FIG. 2A refers to the case wherein pre-polymers having an initial I.V. of 0.30 dl/g are used, with overall residence time of three hours and with reaction temperature inside each reactor of 210° C. (curve T1), 220° C. (curve T2) and 230° C. (curve T3).

As it will be noticed by examining the trend of the three curves T1, T2 and T3, the number of single fluidised bed reactors beyond which the final I.V. increase is no more significant is about five.

FIG. 2B refers to the case wherein the overall residence time is of five hours and the steady reaction temperature inside each reactor is of 220° C., by using pre-polymers having an initial I.V. of 0.20 dl/g (curve V1), 0.26 dl/g (curve V2) and 0.30 dl/g (curve V3).

As it will be noticed by examining the trend of the three curves V1, V2 and V3, the number of single fluidised bed reactors beyond which the final I.V. increase is no more significant is about five.

Figure 2C:
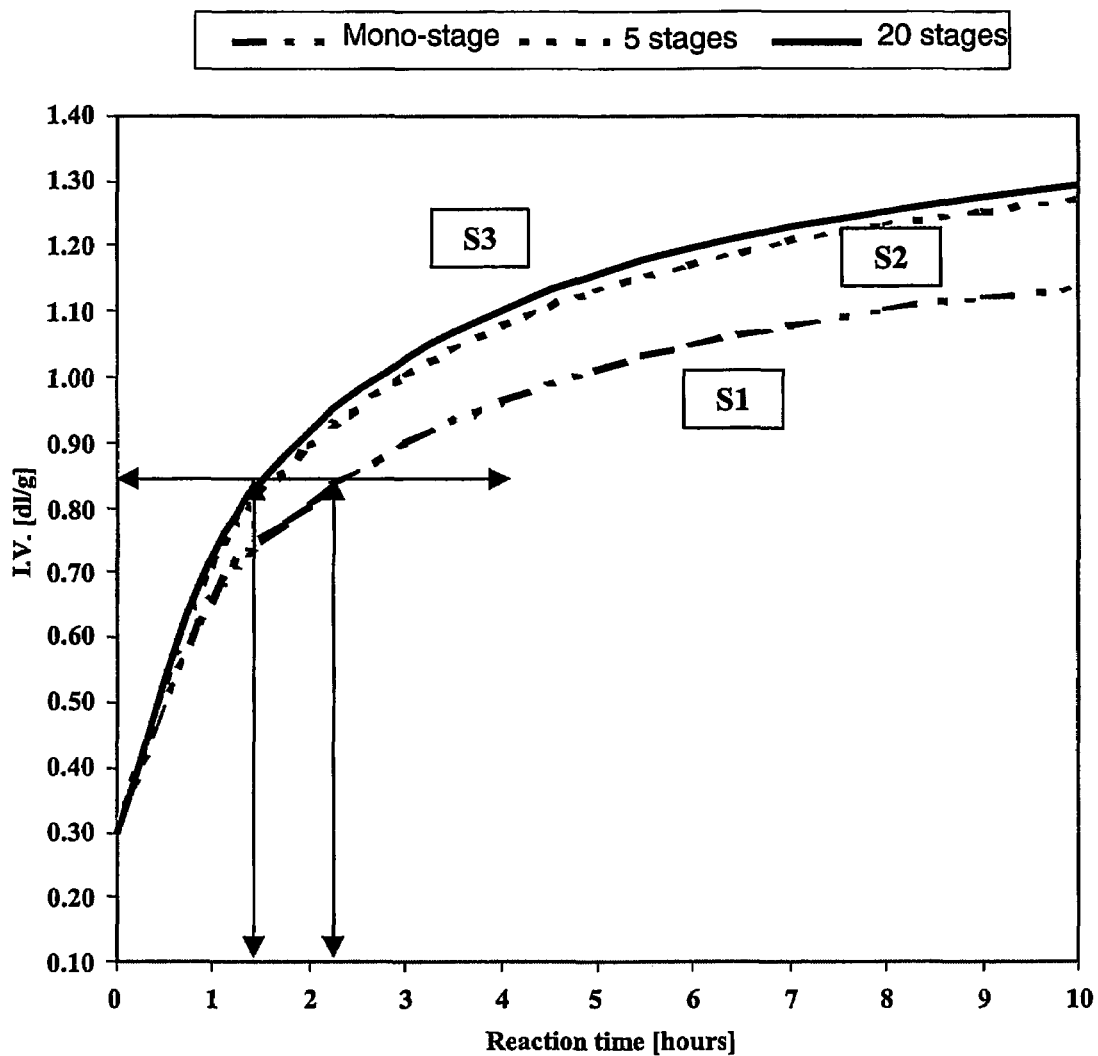

With reference to FIG. 2C, the trend of the average I.V. final value with respect to the reaction time required to attain the desired polymerisation is shown.

FIG. 2C refers to the case wherein pre-polymers having an initial I.V. of 0.30 dl/g are used, with reaction temperature of 230° C. and with a number of fluidised stages of one (curve S1), five (curve S2) and twenty (curve S3).

As it will be noticed by examining the trend of the three curves S1, S2 and S3, the number of fluidised stages beyond which the reaction time reduction is no more significant is about five.

Figure 2D:
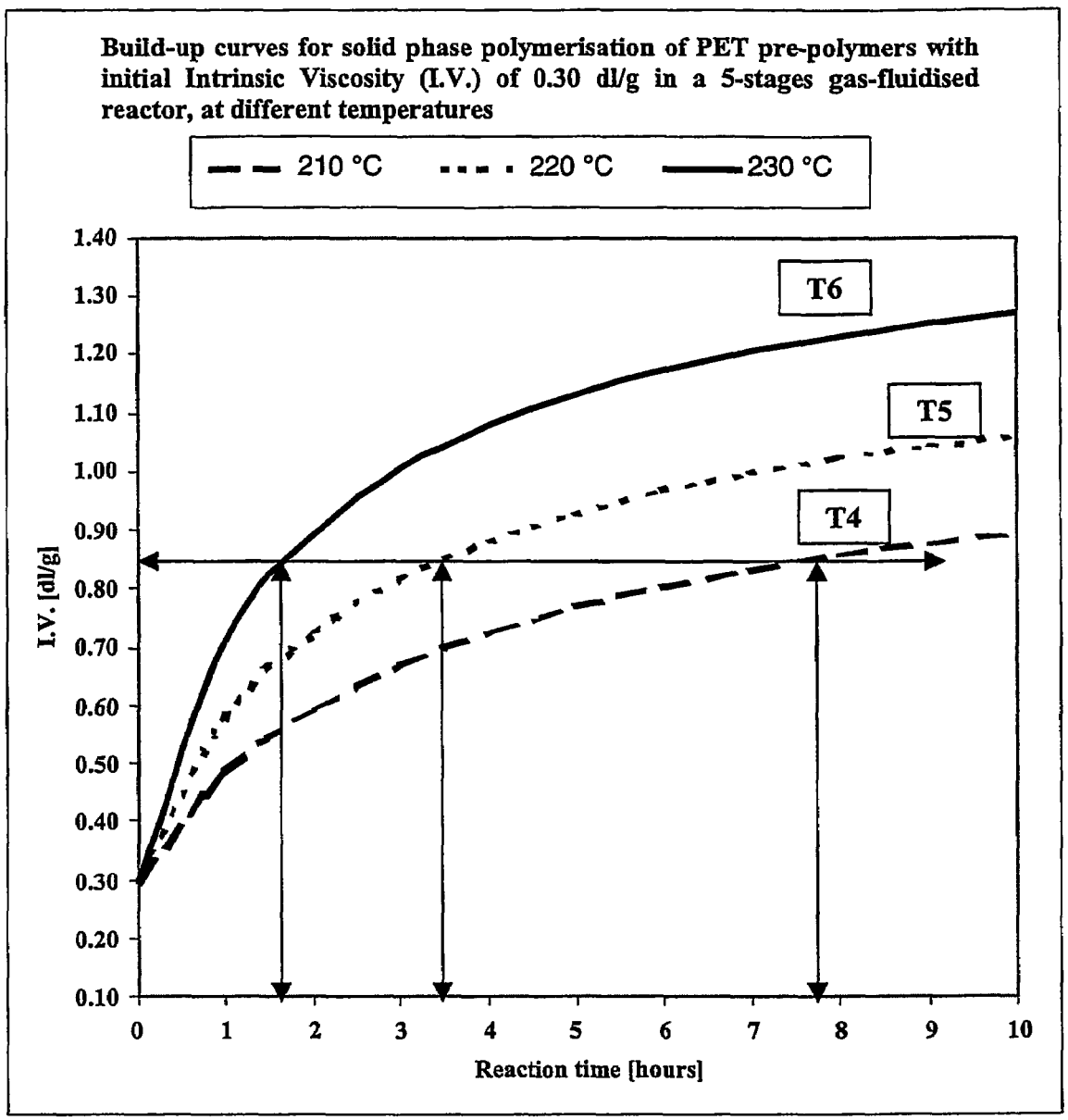

FIG. 2D refers to the case wherein pre-polymers having an initial I.V. of 0.30 dl/g are used, with a plant having five fluidised stages and with reaction temperature of 210° C. (curve T4), 220° C. (curve T5) and 230° C. (curve T6).

As it will be noticed by examining the trend of the three curves T4, T5 and T6, in a plant provided with five fluidised stages, meaning to achieve a final intrinsic viscosity I.V. value of about 0.84 dl/g, the more the reaction temperature is high the more the reaction time reduction is significant.

Figure 2E:
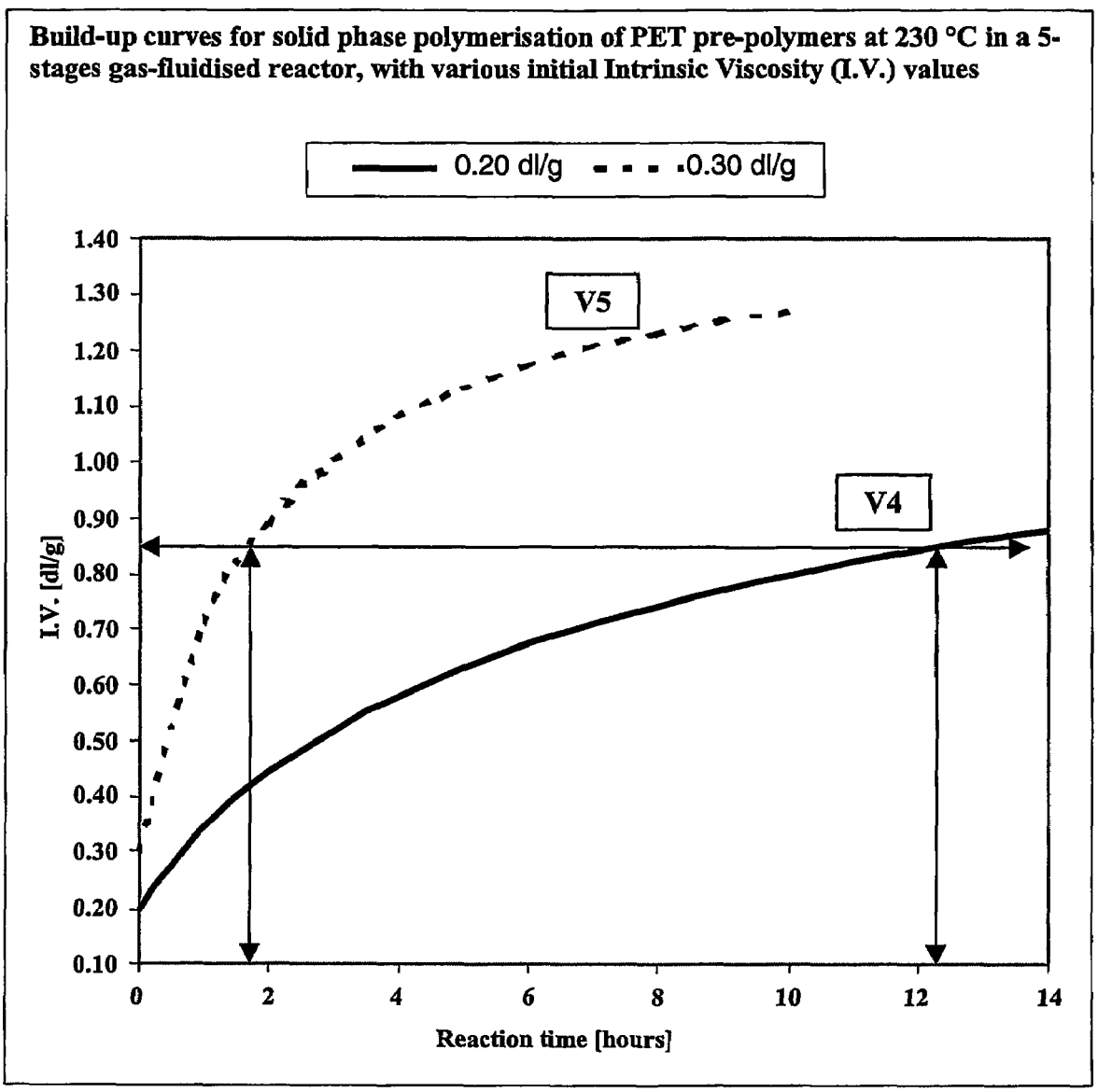

FIG. 2E refers to the case wherein a plant having five fluidised stages is used, with temperature of 230° C. and by using pre-polymers having an initial I.V. of 0.20 dl/g (curve V4) and 0.30 dl/g (curve V5).

As it will be noticed by examining the trend of the two curves V4 and V5, in a plant provided with five fluidised stages, meaning to achieve a final intrinsic viscosity I.V. value of about 0.84 dl/g, a moderate increase of the pre-polymer initial I.V. results in a considerable reduction of the reaction time.

Figure 3A:
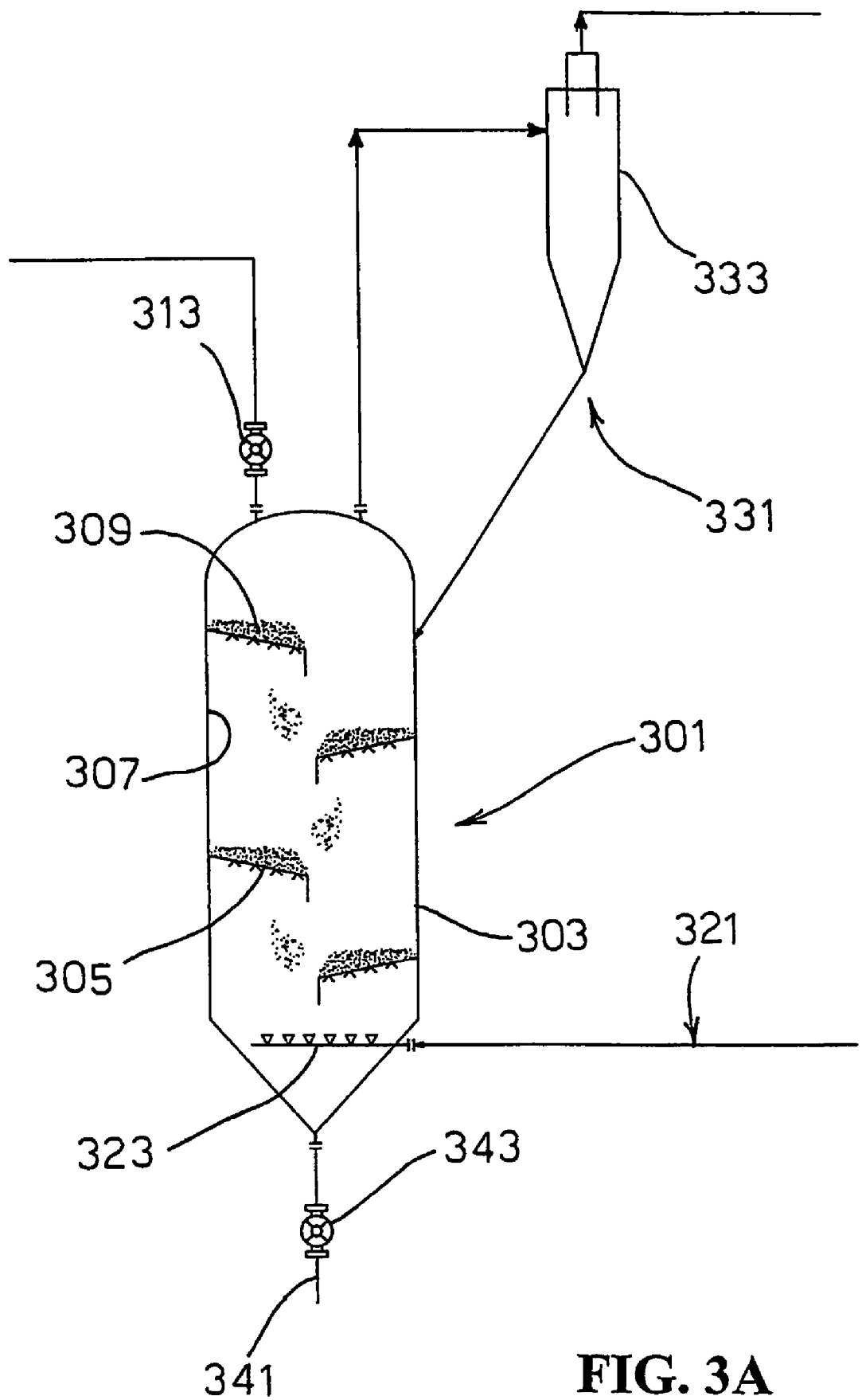
FIG. 3A is a diagram of a second embodiment of the invention.

With reference to FIG. 3A a second embodiment of the invention is shown, wherein a reactor 301 comprising a vertically arranged casing 303, having a substantially cylindrical shape, is provided.

A first feeding line 311, equipped with a device 313 (for example, a rotating volumetric distributing apparatus) to regulate the flow-rate of fed amorphous PET pre-polymer and to prevent gas leakage, is provided to feed, from the top of reactor 301, a continuous low molecular weight PET pre-polymers flow, preferably a PET sand having granules with size in the range 100÷200 µm.

A second gas feeding line 321 is provided to feed through supply valves 323 an inert gas flow, preferably nitrogen, from the bottom into the reactor 301, in counter-current flow with respect to the descending pre-polymer flow inside the reactor 301.

A circuit 331 connected to the top of the reactor 301 is provided to purify the gas and to recover pre-polymer particles by means of a proper separator 333, such as a cyclone; solid particles dragged by the gas exiting the reactor 301 and recovered by means of the separator 333, are then recycled to the reactor 301.

Figure 3B:
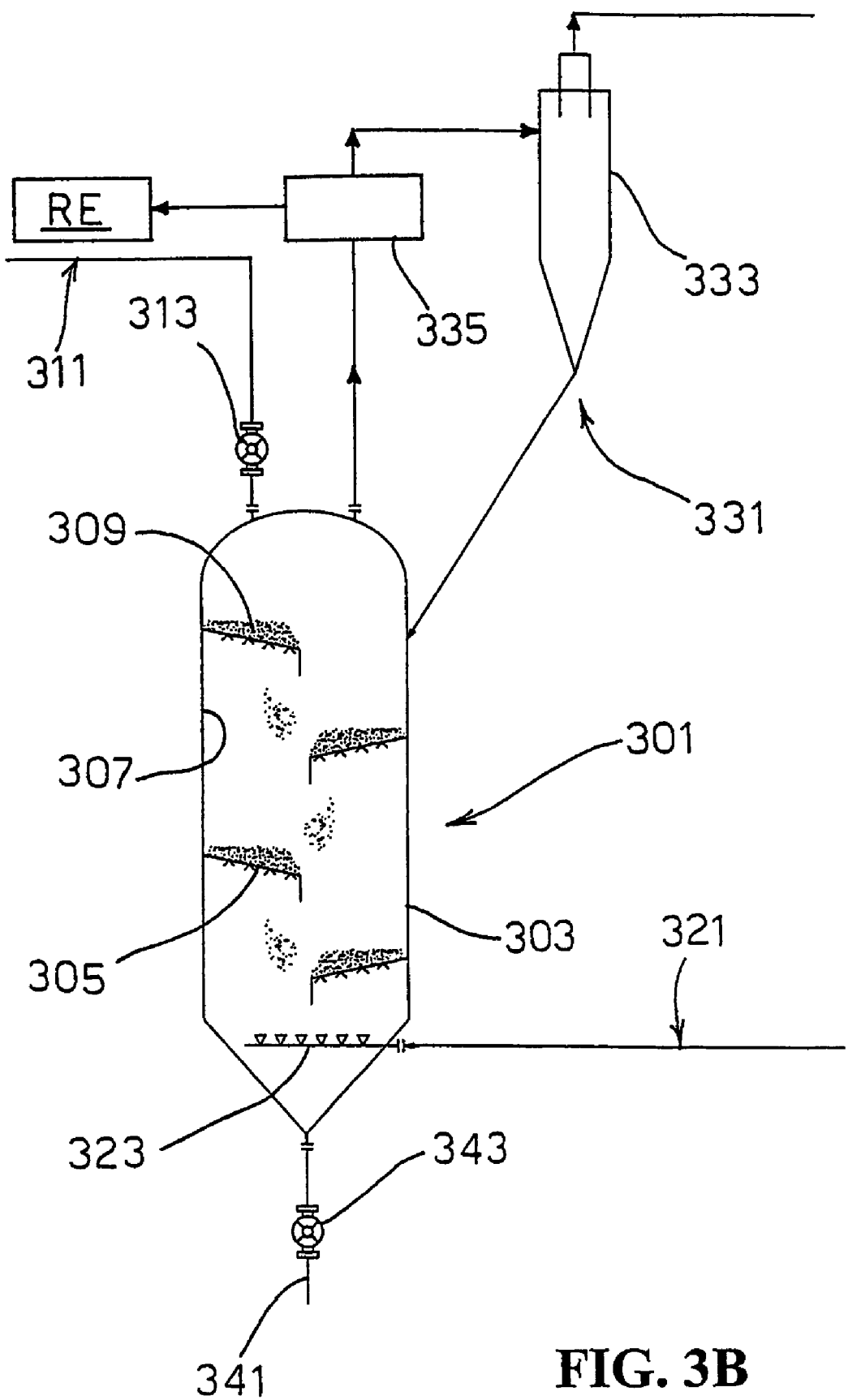
FIG. 3B is a diagram according to an alternative form of the embodiment of the invention shown in FIG. 3A.

According to an alternative form, shown in FIG. 3B, the gaseous flow containing, among others, ethylene glycol and oligomers, is forced to preventively pass through an appropriate separation device 335, such as for example a condensation separator, wherein ethylene glycol and oligomers are recovered at the liquid state and then recycled to the esterification reactor RE that is located upstream the manufacturing plant to carry out the primary reaction of the PET manufacturing process.

The gas without solid particles leaving the separator 333 from its head, is conveyed to a following purification unit (not shown) wherein all the residual hydrocarbons that are present in the gaseous flow are removed by means of known techniques, for example the catalytic oxidation; said gas flow is then subjected to drying, for example for adsorption on molecular sieves, and then recycled to the solid phase polymerisation reactor 301 as fluidising and stripping means of the reaction gaseous by-products.

A third discharging line 341, equipped with a device 343 (for example, a rotating volumetric distributing apparatus) to discharge the PET after solid phase polymerisation and to prevent gas leakage, is provided to discharge the polymerised product by being inferiorly connected to the bottom of the reactor 301.

Advantageously, according to the invention, almost horizontal shelves 305 are provided inside the reactor 301.

Said shelves 305 are preferably formed from holed metal plates secured, for example by welding, to the internal wall 307 of the casing 303 so to extend substantially up to the centre line of the chamber created inside the casing 303.

Said shelves 305 are further preferably alternately arranged so to define, inside the reactor 301, an obligatory path that forces the pre-polymers flow to pass through at least two or more plates on which, thanks to the action of the opposite direction gas flow, corresponding fluidised stages 309 are thus generated.

According to the invention, the pre-polymers flow, coming from the feeding line 311, passes through a plurality of fluidised stages 309, prior to reach the reactor bottom and to be removed through the discharge line 341.

During crossing reactor 301, pre-polymers are conveniently polymerised by achieving the desired intrinsic viscosity I.V.

According to the invention, the intrinsic viscosity value attained at the end of the reaction depends on the number of the fluidised stages.

As it is evident from the preceding description, said fluidised stages are preferably in the number of five.

With reference to the embodiment of FIG. 1A, three carrying out examples are hereinafter described.

EXAMPLE 1

Some tests with "PET sand" have been carried out in a pilot plant comprising a fluidised reactor 101 having five stages in series, of parallelepiped shape.

Downstream the reactor, after the device 143 that in this example was a gas-tight rotating volumetric distributing apparatus device, a cooling unit of the (single stage) fluidised bed type was provided wherein air has been used as heat transferring and fluidising medium.

The solid phase polymerisation reactor 101, as already said, is a multistage (five stages arranged in series) fluidised reactor having parallelepiped shape, the base being 1,400 mm×500 mm (gas distribution plate total surface) and the height being 3,200 mm, wherein the solid is fed at a end of the long side and the same progressively reacts by overflowing from a stage to the following one according to modes comparable to that of a fluid, and wherein the fluidising, heat transferring and gaseous reaction by-products removing gas is fed in cross-flow with respect to the solid phase.

The five stages with same volumes, completely independent from the point of view of both the gas fluid-dynamics and the solid one, are obtained by means of dividing walls 105a having decreasing height (respectively 2,000, 1,900, 1,800, 1,700 and 1,600 mm).

To prevent that the "PET sand" could "skip" one or more stages, close to the centre line of each stage a descending. deflector (not shown) has been inserted, having an aperture in the top portion, said aperture being finalised to allow the removal of the gas exiting the single stages avoiding an acceleration of the gas itself close to the overflows.

Each stage receives from the bottom the hot gas, through a distribution plate formed by a sintered steel plate, whose porosity is of 6.2% and which assures a ΔP of about 50 mbar, so to guarantee a uniform distribution of the gas itself.

Each stage, as aforesaid, has a dedicated gas feeding circuit that is formed by a butterfly valve for flow-rate regulation, an electric heater for gas temperature control and a "settling chamber" onto which the above-mentioned gas distribution sintered plate is placed.

After having performed its numerous functions (heat transfer, fluidisation and reaction gaseous by-products removal) the gas is discharged from the reactor 101 passing through at first an inertial separator (for example, of the multi-plate type) and then a centrifugal separator (for example, a cyclone) 133, both suitable for separating the possible dragged "PET sand" particles.

The employed gas velocity is of 3 times with respect to the minimum fluidisation velocity for the first stage and 2 times with respect to the minimum fluidisation velocity for the stages from the 2$^{nd}$ to the 5$^{th}$, this to create a higher vacuum degree in the first fluidised stage so to oppose the agglomeration tendency of. the fed cold amorphous "PET sand", while for the stages from the 2$^{nd}$ to the 5$^{th}$, having the "PET sand" crystallinity values gradually increasing (as a consequence of the maintaining at temperature), said agglomeration risk is reduced.

The gas is nitrogen (purity: 99.99%) with a dew point of −45° C. For the solid phase polycondensation test a "PET sand", formed by particles of 200 μm size (more precisely: 99.9%<220 μm and 0.1%<180 μm) of amorphous PET containing 2.0% by weight of isophthalic acid and having a melting point of 251° C., has been employed.

The PET granules flow was of 250 kg/h; the overall hold-up of solid in the five stages (at the fluidisation conditions abovementioned) was measured to be 360 kg (weigh of the "PET sand" mass contained in the five stages when stopping the gas feeding): it results an average residence time of the solid equal to 1 hour and 25 minutes (360 kg/250 kg/h). The prepolymer starting intrinsic viscosity was 0.30±0.005 dl/g; the acetaldehyde content was 47 p.p.m.; the PET granules temperature at the entrance of the reactor was 23° C. The temperature of the gas fed to the five stages was 228±0.5° C.

The same "PET sand", after solid phase polymerisation, at the exit of the reactor had a final intrinsic viscosity of 0.82±0.01 dl/g.

EXAMPLE 2

In this second carrying out example of the process according to the invention, all the conditions applied in the first example have been retained, with the exception of the fed gas temperature, which has been set as follows:
1$^{st}$ stage: 228±0.5° C.;
2$^{nd}$ stage: 229±0.5° C.;
3$^{rd}$ stage: 229±0.5° C.;
4$^{th}$ stage: 230±0.5° C.;
5$^{th}$ stage: 230±0.5° C.

The "PET sand", after solid phase polymerisation, at the exit of the reactor had a final intrinsic viscosity of 0.854±0.01 dl/g.

EXAMPLE 3

In this third carrying out example of the process according to the invention, all the conditions applied in the first example have been retained, with the exception of the intrinsic viscosity of the fed amorphous "PET sand" and of the temperature of the gas fed to the five stages.

In particular, amorphous "PET sands" have been used having the following different intrinsic viscosity parameters: 0.26±0.005 dl/g; 0.36±0.005 dl/g; 0.45±0.005 dl/g; 0.58±0.005 dl/g. In all these tests the gas feeding temperature (gas temperature equal for the five stages) has been made to change, so as to achieve a final intrinsic viscosity of 0.82 dl/g for the "PET sand" after polymerisation.

Obviously, not having changed the feeding flow-rate of both the solid and the gas, the average residence time of the solid remained of 1 hour and 25 minutes.

The gas temperatures, to achieve the same solid phase polymerised PET final intrinsic viscosity of 0.82 dl/g for starting from the four different "PET sands", have been respectively: 229±0.5° C.; 225±0.5° C.; 218±0.5° C.; 211±0.5° C.

In each of the checked conditions, the final intrinsic viscosity variation have been noticed to be of ±0.01 dl/g, corresponding to an increase of the final intrinsic viscosity variation due to solid phase polymerisation of ±0.005 dl/g, this confirming the good "plug-flow" behaviour achieved on the solid phase in the serial multistage process.

It has to be noticed that in the conventional solid phase polymerisation processes, such as those carried out inside a cylindrical, with vertical axis, moving bed reactor, the increase of the final intrinsic viscosity variation due to solid phase polymerisation is of 0.01±0.015 dl/g.

The same test has been also performed in a conventional, cylindrical, vertical, moving bed reactor having an internal diameter of 1.6 meters, bed height of 8 meters and "PET sand" downhill velocity of 0.42 meters/hour.

The "PET sand", in this case, was previously crystallised to a degree of crystallinity $X_c$=38% so as to give proper flowability to the subsequent moving bed reactor, by heating and maintaining a temperature of 200° C. for 5 minutes.

All the tests performed with this plant arrangement have highlighted a process threshold value of 216±0.5° C., beyond which irreversible agglomeration phenomena among particles started to occur, this resulting in a progressive loss of flowability.

Only with "PET sand" having initial I.V. of 0.45±0.005 dl/g and with the one having initial I.V. of 0.58±0.005 dl/g it was possible to solid phase polymerise, achieving a final I.V. of 0.82 dl/g.

In the first case the residence time was of 16 hours at a temperature of 215±0.5° C. and in the second one of 9.5 hours at a temperature of 215±0.5° C.

The exposed example clearly shows that a conventional, cylindrical, vertical, moving bed reactor has a threshold maximum temperature as well as a limit to the intrinsic viscosity increase achievable by keeping unchanged the reactor, the bed height and velocity.

In this specific case, the allowed maximum temperature of the reactor was of about 215° C. and the achievable maximum intrinsic viscosity increase was of about 0.37 dl/g (0.82 final −0.45 initial) with a bed reactor height of 8 meters and a velocity of 0.42 meters/hour.

From what above disclosed, it clearly results that the process according to the invention allows to achieve a higher PET molecular weight increase as well as to operate at a temperature significantly higher than those previously employed with the conventional moving bed processes, without agglomeration phenomena and other unwanted side effects and achieving a good result in terms of uniformity of the product final characteristics, thanks to the "plug-flow" behaviour on the solid phase in the plurality of fluidised stages in series.

Furthermore the invention will be advantageously applicable to any polyester which can be solid phase polymerised. The most common polyesters suitable for use in the invention have at least about 75 mole percent of their acid moieties provided by an aromatic dicarboxylic acid, such as terephthalic acid, isophthalic acid, or a naphthalenic dicarboxylic acid (preferably 2,6-) with the diol moieties provided by glycols such as ethylene glycol, butylene glycol, 1,4-dimethylol cyclohexane and the like or aromatic diols such as hydroquinone and catechol. Said polyesters can contain other dicarboxylic acids such as adipic acid, isophthalic acid, sebacic acid, and the like. Polyethylene terephthalate, polyethylene isophthalate, polyethylene naphthalate, and polybutylene terephthalate homopolymers are representative examples of such polyesters.

Blends of various polyesters can also be solid phase polymerised in the process according to the invention. The polyester pre-polymers (amorphous starting polyesters) utilised in this invention can be made in any manner but are typically prepared by conventional melt phase polymerisation techniques. These polyester pre-polymers have an initial starting IV of at least about 0.2 dl/g as measured in a 60:40 (by weight): phenol÷1,1,2,2,-tetrachloroethane solvent system at a temperature of 30° C. The rate at which polyethylene terephthalate pre-polymer can be solid state polymerised also depends on the carboxyl end group (i.e. —COOH) content of the pre-polymer. Generally, pre-polymers having a carboxyl end group content within the range of about 18% to about 40% achieve maximum solid state polymerisation rates. It is preferred for such pre-polymers to have a carboxyl end group content within the range of about 24% to 33% (see for example U.S. Pat. No. 4,238,593). Suitable polyester pre-polymers which can be solid state polymerised using my invention are comprised of one or more diacid components and one or more diol components. The diacid component in the polyesters are normally alkyl dicarboxylic acids which contain from 4 to 36 carbon atoms, diesters of alkyl dicarboxylic acids which contain from 6 to 38 carbon atoms, aryl dicarboxylic acids which contain from 8 to 20 carbon atoms, diesters of aryl dicarboxylic acids which contain from 10 to 2.2 carbon atoms, alkyl substituted aryl dicarboxylic acids which contain from 9 to 22 carbon atoms, or diesters of alkyl substituted aryl dicarboxylic acids which contain from 11 to 22 carbon atoms.

The preferred alkyl dicarboxylic acids will contain from 4 to 12 carbon atoms. Some representative examples of such alkyl dicarboxylic acids include glutaric acid, adipic acid, pimelic acid, and the like. The preferred diesters of alkyl dicarboxylic acids will contain from 6 to 12 carbon atoms. A representative example of such a diester of an alkyl dicarboxylic acid is azelaic acid. The preferred aryl dicarboxylic acids contain from 8 to 16 carbon atoms. Some representative examples of aryl dicarboxylic acids are terephthalic acid, isophthalic acid, and orthophthalic acid.

The preferred diesters of aryl dicarboxylic acids contain from 10 to 18 carbon atoms. Some representative examples of diesters of aryl dicarboxylic acids include diethyl terephthalate, diethyl isophthalate, diethyl orthophthalate, dimethyl naphthalate, diethyl naphthalate and the like. The preferred alkyl substituted aryl dicarboxylic acids contain from 9 to 16 carbon atoms and the preferred diesters of alkyl substituted aryl dicarboxylic acids contain from 11 to 15 carbon atoms.

The diol component of the polyester pre-polymers is normally comprised of glycols containing from 2 to 12 carbon atoms, glycol ethers containing from 4 to 12 carbon atoms, and polyether glycols having the structural formula HO-(A-O)$_n$—H wherein A is an alkylene group containing from 2 to 6 carbon atoms and wherein n is an integer from 2 to 400. Generally, such polyether glycols will have a molecular weight of 400 to about 4000. Preferred glycols normally contain from 2 to 8 carbon atoms and more preferably from 4 to 8 carbon atoms. Some representative examples of glycols that can be utilised as the diol component include ethylene glycol, 1,3-propylene glycol, 1,2-propylene glycol, 2,2-diethyl-1,3-propane diol, 2,2-dimethyl-1,3-propane diol, 2-butyl-1,3-propane diol, 2-ethyl-2-isobutyl-1,3-propane diol, 1,3-butane diol, 1,4-butane diol, 1,5-pentane diol, 1,6-hexane diol, 2,2,4-trimethyl-1,6-hexane diol, 1,3-cyclohexane dimethanol, 1,4-cyclohexane dimethanol, and 2,2,4,4-tetramethyl-1,3-cyclobutane diol. Some representative examples of polyether glycols that can be used include polytetramethylene glycol and polyethylene glycol.

Branched polyester pre-polymers can also be solid state polymerised in the process of the present invention. Such branched polyesters normally contain branching agents which have three or more functional groups and preferably three or four functional groups. Reactive functional groups can be carboxyl groups or aliphatic hydroxyl groups. The branching agent utilised in such branched polyesters can optionally contain both carboxyl groups and hydroxyl groups. Examples of acidic branching agents include trimesic acid, trimellitic acid, pyromellitic acid, butane tetracarboxylic acid, naphthalene tricarboxylic acids, and cyclohexane-1, 3,5-tricarboxylic acids. Some representative examples of hydroxyl branching agents (polyols) include glycerin, trimethylol propane, pentaerythritol, dipentaerythritol, 1,2,6-hexane triol, and 1,3,5-trimethylol benzene. Generally, from 0 to 3 percent of a polyol containing from 3 to 12 carbon atoms will be used as the branching agent (based upon the total diol component).

High strength polyesters which utilise at least one bis-hydroxyalkyl pyromellitic diimide in their diol component can also be solid state polymerised. The diol component in these polyesters will normally contain from 5 to 50 mole percent of one or more bis-hydroxyalkyl pyromellitic diimides and will preferably be comprised of from 10 to 25 mole percent of at least one bis-hydroxyalkyl pyromellitic diimide. The remaining portion of the diol component is comprised of additional copolymerisable diols.

The invention claimed is:

1. A reactor for solid phase continuous polymerisation of polyethylene terephthalate (PET), comprising:
   a casing;
   a feeding line to feed a low molecular weight PET pre-polymers flow into said reactor;
   a gas line to feed, through supply valves, a gas into said reactor;
   a discharging line inferiorly connected to the bottom of the reactor to discharge the polymerised product;
   a circuit connected to the reactor to purify the gas and to recover pre-polymer particles by means of a proper separator;
   wherein, said casing of said reactor is horizontally arranged; and
   wherein, inside said reactor, means are provided to generate a plurality of fluidised stages in series to cause an increase of the intrinsic viscosity (I.V.) of said PET pre-polymers flow; and
   wherein in correspondence with each fluidised stage a sufficient gas flow is generated by said supply valves, each valve being equipped with a heating device,
   wherein said I.V. increase of said PET pre-polymers flow is $\geq 0.06$ dl/g.

2. The reactor according to claim 1, wherein said casing of said reactor has a substantially parallelepiped shape.

3. The reactor according to claim 2, wherein said means comprise a plurality of inferior vertical walls secured to the base of said reactor and a plurality of superior vertical walls secured to the ceiling of said reactor, said fluidised stages being generated between said inferior walls.

4. The reactor according to claim 1, wherein said fluidised stages in series are five in number.

5. The reactor according to claim 1, wherein said feeding line is equipped with a device suitable for regulating the flow-rate of fed amorphous PET pre-polymer and to prevent gas leakage.

6. The reactor according to claim 5, wherein said device is a rotating volumetric distributing apparatus.

7. The reactor according to claim 1, wherein said discharging line is equipped with a device suitable for discharging the PET after solid phase polymerisation and to prevent gas leakage.

8. The reactor according to claim 7, wherein said device is a rotating volumetric distributing apparatus.

9. The reactor according to claim 1, wherein said circuit further comprises a separation device to recover ethylene glycol and oligomers at the liquid state and then to recycle them upstream of the overall PET manufacturing cycle.

10. The reactor according to claim 1, wherein said PET pre-polymers flow has a low initial I.V. value, generally an I.V. value in the range of 0.20-0.45 dl/g.

11. The reactor according to claim 1, wherein said I.V. increase of said PET pre-polymers flow is in the range of 0.35-0.65 dl/g.

12. The reactor according to claim 1, wherein said I.V. increase of said PET pre-polymers flow is $\geqq 0.20$ dl/g.

13. The reactor according to claim 1, wherein said PET pre-polymers flow is a PET sand flow, the sand particle size preferably being in the range 60-300 µm.

14. The reactor according to claim 13, wherein said PET pre-polymers flow is a PET sand flow, the sand particle size preferably being in the range 100-250 µm.

15. The reactor according to claim 1, wherein said PET pre-polymers flow fed into the reactor is maintained in said reactor at a temperature in the range 200-235° C.

16. The reactor according to claim 15, wherein said PET pre-polymers flow fed into the reactor is maintained in said reactor at a temperature in the range 205-230° C.

17. The reactor according to claim 1, wherein said gas is an inert gas.

18. The reactor according to claim 1, wherein said gas flow inside said reactor is directed in cross-flow or in counter-current flow with respect to the flow of the PET granules that pass through said reactor.

19. The reactor according to claim 1, wherein the ratio between the mass of the gas flow that passes through said reactor and the mass of the PET granules in the reactor is >0.62.

20. The reactor according to claim 19, wherein the ratio between the mass of the gas flow that passes through said reactor and the mass of the PET granules in the reactor is >0.9.

21. The reactor according to claim 1, wherein said gas is an inert gas or air.

22. The reactor according to claim 21, wherein said gas is air with a dew point <−30° C.

23. The reactor according to claim 21, wherein said gas is a mixture of gases selected from the group consisting of nitrogen, noble gases, carbon dioxide, carbon monoxide and oxygen, and wherein the oxygen content is <10% by weight.

24. The reactor according to claim 21, wherein said gas is a mixture of gases selected from the group consisting of nitrogen, noble gases, carbon dioxide, carbon monoxide and oxygen, and wherein the oxygen content is <6% by weight.

25. The reactor according to claim 1, wherein the gas is recycled to the reactor, after having been purified of the organic impurities, until a level of organic impurities $\leqq 100$ p.p.m. by weight ($CH_4$ equivalent) has been reached.

26. The reactor according to claim 1, wherein the PET granules have an irregular shape with a volume comprised between 0.05 and 10 $mm^3$.

27. The reactor according to claim 1, wherein inside said reactor the polyester granules are subjected to a solid phase polycondensation and/or drying and/or crystallisation and/or dealdehydisation.

28. A process for solid phase continuous polymerisation of polyethylene terephthalate (PET), comprising the steps of:
feeding a low molecular weight PET pre-polymers flow into a horizontally arranged reactor through a feeding line;
feeding a gas into said reactor through a gas line in cross-flow or in counter-current flow with respect to said PET pre-polymers flow,
carrying out said polymerisation in a plurality of fluidised stages in series generated inside said reactor to cause an increase of the intrinsic viscosity (I.V.) of $\geqq 0.06$ dl/g of said PET pre-polymers flow, and
bringing at the desired temperature the gas flowing through supply valves, each valve being associated to a fluidsed stage and being equipped with a heating device.

29. The process according to claim 28, wherein said polymerisation is carried out in a number of fluidised stages in series of five.

30. The process according to claim 29, wherein said polymerisation is carried out at non-isothermal conditions.

31. The process according to claim 29, wherein said polymerisation is carried out at isothermal conditions.

32. The process according to claim 29, wherein said polymerisation is carried out in a time period of about 2 hours.

33. The process according to claim 28, wherein said PET pre-polymers flow has a low initial I.V. value, generally an I.V. value in the range of 0.20-0.45 dl/g.

34. The process according to claim 28, wherein said I.V. increase of said PET pre-polymers flow is in the range of 0.35-0.65 dl/g.

35. The process according to claim 34, wherein said I.V. increase of said PET pre-polymers flow is $\geqq 0.20$ dl/g.

36. The process according to claim 28, wherein said PET pre-polymers flow is a PET sand flow, the sand particle size being in the range 60-300 µm.

37. The process according to claim 36, wherein said PET pre-polymers flow is a PET sand flow, the sand particle size being in the range 100-250 µm.

38. The process according to claim 28, wherein said PET pre-polymers flow fed into the reactor is maintained in said reactor at a temperature in the range 200-235° C.

39. The process according to claim 38, wherein said PET pre-polymers flow fed into the reactor is maintained in said reactor at a temperature in the range 205-230° C.

40. The process according to claim 28, wherein said gas is an inert gas.

41. The process according to claim 28, wherein said gas flow inside said reactor is directed in cross-flow or in counter-current flow with respect to the flow of said PET granules that pass through said reactor.

42. The process according to claim 28, wherein the ratio between the mass of the gas flow that passes through the reactor and the mass of the PET granules in the reactor is >0.62.

43. The process according to claim 42, wherein the ratio between the mass of the gas flow that passes through the reactor and the mass of the PET granules in the reactor is >0.9.

44. The process according to claim 28, wherein said gas is an inert gas or air.

45. The process according to claim 44, wherein said gas is air with a dew point <−30° C.

46. The process according to claim 44, wherein said gas is a mixture of gases chosen from the group consisting of one or more of nitrogen, noble gases, carbon dioxide, carbon monoxide and oxygen, and wherein the oxygen content is <10% by weight.

47. The process according to claim 44, wherein said gas is a mixture of gases chosen from the group consisting of nitrogen, noble gases, carbon dioxide, carbon monoxide and oxygen, and wherein the oxygen content is <6% by weight.

48. The process according to claim 28, wherein the gas is recycled to the reactor, after having been purified of the organic impurities, until a level of organic impurities $\leqq 100$ p.p.m. by weight ($CH_4$ equivalent) has been reached.

49. The process according to claim 28, wherein the PET granules have an irregular shape with a volume comprised between 0.05 and 10 $mm^3$.

50. The process according to claim 28, wherein inside said reactor the polyester granules are subjected to one or more processes selected from the group consisting of solid phase polycondensation, drying, crystallisation and dealdehydisation.

51. The process according to claim 28, wherein ethylene glycol and oligomers present at the end of said polymerisation are recovered at the liquid state in a separation device provided in a circuit connected to the reactor and then recycled upstream of the overall PET manufacturing cycle.

* * * * *